United States Patent
Ichikawa et al.

(10) Patent No.: US 8,907,617 B2
(45) Date of Patent: Dec. 9, 2014

(54) POWER TRANSFER SYSTEM AND NONCONTACT CHARGING DEVICE

(75) Inventors: Keiichi Ichikawa, Nagaokakyo (JP); Henri Bondar, Kyoto (JP)

(73) Assignee: Murata Manufacturing Co., Ltd, Nagaokakyo-Shi, Kyoto-fu (JP)

( * ) Notice: Subject to any disclaimer, the term of this patent is extended or adjusted under 35 U.S.C. 154(b) by 555 days.

(21) Appl. No.: 13/329,630

(22) Filed: Dec. 19, 2011

(65) Prior Publication Data

US 2012/0146574 A1 Jun. 14, 2012

Related U.S. Application Data

(63) Continuation of application No. PCT/JP2009/002925, filed on Jun. 25, 2009.

(51) Int. Cl.
*H02J 7/00* (2006.01)
*H02J 7/02* (2006.01)

(52) U.S. Cl.
CPC ...................................... *H02J 7/025* (2013.01)
USPC ............................. 320/107; 320/108; 307/104

(58) Field of Classification Search
USPC ............................ 320/107, 108; 307/104, 149
See application file for complete search history.

(56) References Cited

U.S. PATENT DOCUMENTS

| | | | |
|---|---|---|---|
| 6,040,773 A | 3/2000 | Vega et al. | |
| 6,548,988 B2* | 4/2003 | Duff, Jr. | 320/160 |
| 6,611,199 B1 | 8/2003 | Geiszler et al. | |
| 8,242,638 B2* | 8/2012 | Camurati et al. | 307/104 |
| 8,587,156 B2* | 11/2013 | Camurati et al. | 307/104 |
| 8,587,157 B2* | 11/2013 | Camurati et al. | 307/104 |
| 8,729,738 B2* | 5/2014 | Camurati et al. | 307/104 |

FOREIGN PATENT DOCUMENTS

| | | |
|---|---|---|
| DE | 103 04 584 A1 | 8/2004 |
| JP | 2005-79786 | 3/2005 |
| JP | 2009-89520 | 4/2009 |
| WO | WO-97-14112 A1 | 4/1997 |
| WO | WO-2007-107642 A1 | 9/2007 |

OTHER PUBLICATIONS

PCT/JP2009/002923 Written Opinion dated Sep. 18, 2009.
PCT/JP2009/002923 Search Report dated Sep. 18, 2009.

* cited by examiner

*Primary Examiner* — Edward Tso
*Assistant Examiner* — Ramy Ramadan
(74) *Attorney, Agent, or Firm* — Dickstein Shapiro LLP

(57) ABSTRACT

A power transfer system includes a power transmission device, a power reception device and a capacitive coupling conductor. A high-voltage side conductor is formed near the upper surface of a casing of the power transmission device, and a low-voltage side conductor is formed near the lower or surrounding surface of the casing. The power transmission device includes an alternating voltage generating circuit. A high-voltage side conductor is formed near the lower surface of a casing of the power reception device, and a low-voltage side conductor is formed near the upper surface of the casing of the power reception device. The power reception device includes a load circuit. The high-voltage side conductors are capacitively coupled to each other when facing each other, and the low-voltage side conductors are capacitively coupled to each other via a capacitive coupling conductor.

11 Claims, 8 Drawing Sheets

POWER TRANSFER SYSTEM AND NONCONTACT CHARGING DEVICE

CROSS REFERENCE TO RELATED APPLICATIONS

The present application is a continuation of International application No. PCT/JP2009/002925, filed Jun. 25, 2009, the entire contents of which is incorporated herein by reference.

FIELD OF THE INVENTION

The invention relates to a power transfer system that transfers electric power in a noncontact manner and a noncontact charging device that uses the power transfer system.

BACKGROUND OF THE INVENTION

Patent Document 1 and Patent Document 2 describe existing techniques related to a noncontact power transfer system. The power transfer system described in Patent Document 1 increases the efficiency of power transfer between a card reader/writer and a noncontact-type card. Two electrodes are provided for each of the card reader/writer and the noncontact-type card. When power is transferred, the electrodes of the card reader/writer face the electrodes of the noncontact-type card in a pair to transfer electric power through capacitive coupling.

The power transfer system described in Patent Document 1 transfers electric power by forming a symmetric electric dipole, while the power transfer system described in Patent Document 2 transfers electric power through mutual electrostatic induction in such a manner that asymmetric electric dipoles are formed to face coupling electrodes to each other at a short distance.

FIG. 1 is a view that shows the basic configuration of the power transfer system described in Patent Document 2. A power transmission device includes a high-frequency high-voltage generator 1, a passive electrode 2 and an active electrode 3. A power reception device includes a high-frequency high-voltage load 5, a passive electrode 7 and an active electrode 6. Then, the active electrode 3 of the power transmission device is located in proximity to the active electrode 6 of the power reception device via a gap 4 to capacitively couple these two electrodes.

PTL 1—Japanese Unexamined Patent Application Publication No. 2005-079786
PTL 2—Pamphlet of International Publication No. 2007/107642

SUMMARY OF THE INVENTION

However, in the power transfer system described in Patent Document 1, it is necessary to face the two electrodes of the power transmission device to the two electrodes of the power reception device. Thus, the power transmission device and the power reception device are arranged in a prescribed positional relationship. Therefore, there is a problem that the flexibility of arrangement of both the power transmission device and the power reception device is considerably low. In addition, the electrodes of each of the power transmission device and the power reception device have a symmetric configuration, and are isolated from a ground electrode of the circuit. Therefore, there is a problem that a voltage applied to each electrode increases. Furthermore, because the periphery of each electrode is not shielded, there is a problem that an unnecessary electric field (that does not contribute to power transfer) spreads around the electrodes.

In the power transfer system described in Patent Document 2, only the active electrodes face each other. Thus, A lower coupling is occurred and larger voltage is necessary for same distance and power conditions. When the active electrodes are larger to increase flexibility in positioning the electric field is not confined only in between the two facing parts of the active electrodes. Furthermore, there is a problem that, when alternative voltage of the passive electrode at the power reception device side are large, an electric field also similarly spreads therearound.

It is an object of the invention to provide a power transfer system that decreases a voltage applied to coupling electrodes to reduces spreading of an unnecessary electric field and that increases the flexibility of relative positional relationship between a power transmission device and a power reception device.

According to preferred embodiments of the invention, a power transfer system is configured as follows. A power transfer system comprising: a power transmission device and a power reception device, each of which has a capacitive coupling electrode that is capacitively coupled to the capacitive coupling electrode of the device at the other side, wherein the capacitive coupling electrode of each of the power transmission device and the power reception device includes a high-voltage side conductor (active electrode) and a low-voltage side conductor (passive electrode); and a capacitive coupling conductor that is capacitively coupled to the low-voltage side conductor of each of the power transmission device and the power reception device, wherein the power transmission device includes an alternating voltage generating circuit that generates an alternating voltage that is applied between the high-voltage side conductor and low-voltage side conductor of the power transmission device, and the power reception device includes a load circuit of electric power induced between the high-voltage side conductor and low-voltage side conductor of the power reception device.

According to preferred embodiments of the invention, a power transfer system comprising: a power transmission device and a power reception device, each of which has a capacitive coupling electrode that is capacitively coupled to the capacitive coupling electrode of the device at the other side, wherein the capacitive coupling electrode of each of the power transmission device and the power reception device includes a high-voltage side conductor (active electrode) and a low-voltage side conductor (passive electrode); and a capacitive coupling conductor that is electrically continuous with the low-voltage side conductor of the power transmission device and that is capacitively coupled to the low-voltage side conductor of the power reception device, wherein the power transmission device includes an alternating voltage generating circuit that generates an alternating voltage that is applied between the high-voltage side conductor and low-voltage side conductor of the power transmission device, and the power reception device includes a load circuit of electric power induced between the high-voltage side conductor and low-voltage side conductor of the power reception device.

According to preferred embodiments of the invention, the capacitive coupling conductor is, for example, a woven fabric containing a conductive material. According to preferred embodiments of the invention, the capacitive coupling conductor is, for example, a body formed of a conductor. According to preferred embodiments of the invention, a noncontact charging device includes any one of the above described power transfer system, the load circuit includes a rectifying smoothing circuit that rectifies and smoothes an alternating voltage induced between the high-voltage side conductor and low-voltage side conductor of the power reception device and a charging element that is charged with an output from the rectifying smoothing circuit, and the power transmission device is provided with a control circuit that controls the alternating voltage generating circuit to control charging to the charging element or the load circuit is provided with a control circuit that controls the rectifying smoothing circuit to control charging to the charging element.

According to the above preferred embodiments of the invention, the following advantageous effects may be obtained. The degree of coupling between the power transmission device and the power reception device increases, power transfer efficiency may be improved, and the size of the device may be reduced. Because the power transfer efficiency is improved, it is possible to increase an upper limit of electric power that can be transferred. Because the degree of coupling increases, it is possible to decrease a set voltage applied to the high-voltage side conductor of the power transmission device. In accordance with this, it is possible to decrease the electric potential of the high-voltage side conductor of the power reception device. The high-voltage side conductor is electrostatically shielded, so an unnecessary radiation may be reduced.

DETAILED DESCRIPTION OF THE INVENTION

First Embodiment

Figure 1:
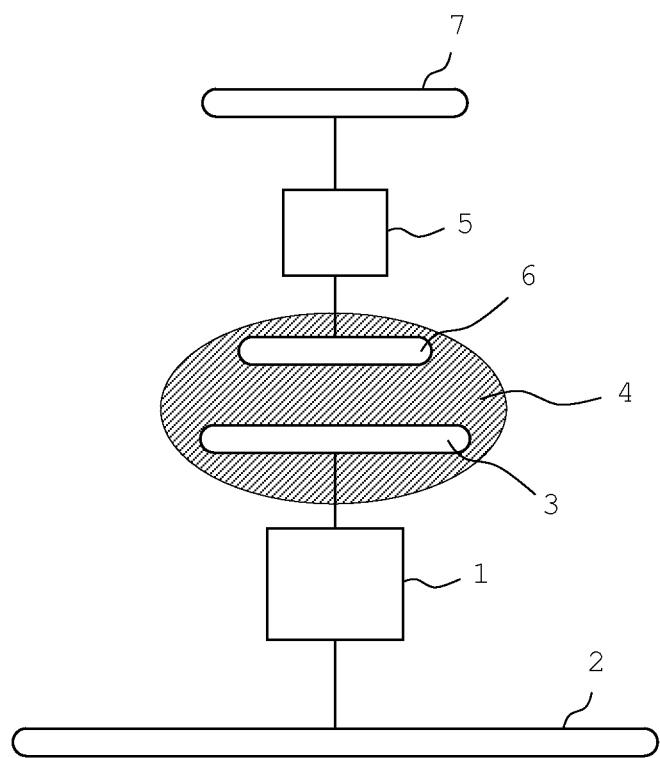
FIG. 1 is a view that shows the basic configuration of a power transfer system described in Patent Document 2.
Figure 2:
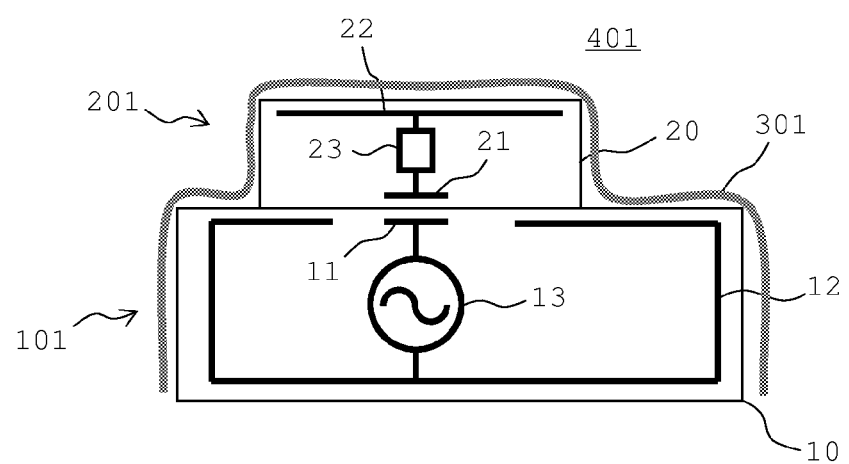
FIG. 2 is a cross-sectional view that conceptually shows a relevant portion of a power transfer system 401.

The configuration of a power transfer system according to a first embodiment will be described with reference to FIG. 2 to FIG. 4. FIG. 2 is a cross-sectional view that conceptually shows a relevant portion of a power transfer system 401. The power transfer system 401 includes a power transmission device 101 and a power reception device 201. A high-voltage side conductor 11 and a low-voltage side conductor 12 are formed near the upper surface of a casing 10 of the power transmission device 101. The low-voltage side conductor 12 surrounds the high-voltage side conductor 11 in an insulated state from the high-voltage side conductor 11. In addition, an alternating voltage generating circuit 13 is provided inside the casing 10 of the power transmission device 101 and applies an alternating voltage between the high-voltage side conductor 11 and the low-voltage side conductor 12. In this example, the low-voltage side conductor 12 is arranged along the outer peripheral surface of the casing 10. Thus, the alternating voltage generating circuit 13 is covered with the low-voltage side conductor 12.

A high-voltage side conductor 21 is formed near the lower surface of a casing 20 of the power reception device 201. A low-voltage side conductor 22 is formed near the upper surface of the casing 20 of the power reception device 201. In addition, a load circuit 23 is provided inside the casing 20 of the power reception device 201, and a voltage induced between the high-voltage side conductor 21 and the low-voltage side conductor 22 is applied to the load circuit 23.

The power reception device 201 is arranged with respect to the power transmission device 101 so that the high-voltage side conductor 11 of the power transmission device 101 faces the high-voltage side conductor 21 of the power reception device 201.

In this state, a capacitive coupling conductor 301 is placed to cover the upper portions of the power transmission device 101 and power reception device 201. The capacitive coupling conductor 301 is a flexible conductive sheet, and may be formed of woven fabric made of thin metal wire, metal foil, or the like. Usually, the capacitive coupling conductor 301 is coated with an insulator, such as resin, glass, and cloth. In addition, to prevent a local increase in strength of an electric field, the capacitive coupling conductor 301 has almost no sharp portion.

It can be possible to enhance the level of coupling by replacing with the high dielectric constant material at the coupled portion. Also available is ceramic material whose relative dielectric constant is 7, for example.

As shown in FIG. 2, in a state where the power reception device 201 is placed on the power transmission device 101, a capacitance is generated at a portion at which the high-voltage side conductor 11 faces the high-voltage side conductor 21. On the other hand, capacitances are respectively generated between the low-voltage side conductor 12 of the power transmission device 101 and the capacitive coupling conductor 301 and between the low-voltage side conductor 22 of the power reception device 201 and the capacitive coupling conductor 301. That is, the high-voltage side conductors 11 and 21, the low-voltage side conductors 12 and 22 and the capacitive coupling conductor 301 operate as capacitive coupling electrodes.

The low-voltage side conductor 12 of the power transmission device 101 surrounds the high-voltage side conductor 11, so the high-voltage side conductor 11 is electrostatically shielded and, as a result, an unnecessary radiation may be reduced.

The alternating voltage generating circuit 13 is a circuit that uses a coil transformer, a piezoelectric transformer, an LC resonant circuit, or the like, to generate a high-frequency high-voltage of, for example, about 100 kHz to several tens of MHz. The load circuit 23 includes a rectifying smoothing circuit and a low-voltage circuit that operates on a voltage output from the rectifying smoothing circuit. The rectifying smoothing circuit is formed of a diode bridge circuit and a smoothing capacitor. In the case of an alternating load, the alternating load is supplied with an alternating voltage using a step-down transformer or a voltage dividing circuit that directly decreases an alternating voltage without rectifying.

The low-voltage side conductor 12 of the power transmission device 101 has a reference potential (ground potential) of the alternating voltage generating circuit 13. In addition, the low-voltage side conductor 22 of the power reception device 201 has a reference potential (ground potential) of the load circuit 23. Thus, the high-voltage side conductors 11 and 21 operate as active electrodes, while the low-voltage side conductors 12 and 22 operate as passive electrodes.

The power transfer system according to the embodiment of the invention has basic principles on short-range energy transfer using a alternative electromagnetic field (quasi-static electric field). When a wavelength $\lambda$ is sufficiently longer than the size or operating range (distance d) of an electric field oscillating source, that is, when the relationship $d/\lambda \ll 1$ is satisfied, a quasi-static electric field stays (is bound) near the electric field oscillating source. Thus, a radiant quantity to a distant place is vanishingly small.

Note that electromagnetic waves have transverse modes (fields propagates in a direction perpendicular to both fields), whereas, in a power transfer that uses a quasi-static electric field as in the case of the embodiment of the invention, energy is transferred in the same direction as an electric field. In a low-frequency band in which a quasi-static electric field is handled, That is, the figure "Z=V/I" is available. ("Z" is an impedance, "V" is a voltage, "I" is a current)

The casings 10 and 20 are, for example, plastics, such as ABS resin. By integrally forming a conductor layer inside the plastic casing, the outer surface of each casing may be electrically insulated. Thus, if a high voltage higher than or equal to about several hundreds of volts is applied to the high-voltage side conductor 11, safety may be ensured.

Figure 3A:
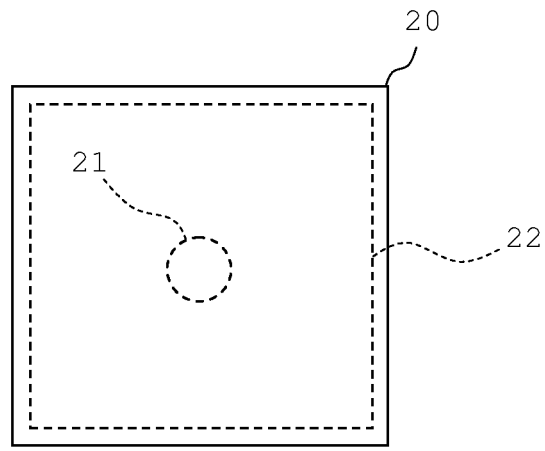
FIG. 3A is a bottom view of a power reception device 201.
Figure 3B:
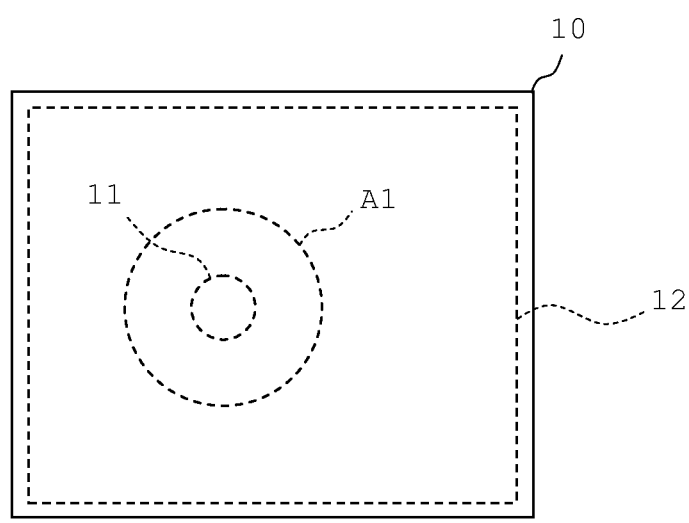
FIG. 3B is a top view of a power transmission device 101.

FIG. 3A is a bottom view of the power reception device 201. FIG. 3B is a top view of the power transmission device 101. The high-voltage side conductor 11 of the power transmission device 101 has a substantially circular shape. The low-voltage side conductor 12 has a substantially circular opening A1 that is coaxial with the high-voltage side conductor 11. That is, the low-voltage side conductor 12 is arranged at a position surrounding the high-voltage side conductor 11 in an insulated state from the high-voltage side conductor 11. In the power reception device 201 as well, the high-voltage side conductor 21 has a substantially circular shape. The low-voltage side conductor 22 is arranged along the upper surface of the casing 20 in an insulated state from the outer surface.

The low-voltage side conductors 12 and 22 are capacitively coupled by a large capacitance via the capacitive coupling conductor 301. Thus, the coupling capacitance between the low-voltage side conductors 12 and 22, which are the passive electrodes, is larger than the coupling capacitance between the high-voltage side conductors 11 and 21, which are the active electrodes. For this reason, the path of a return electric current (electric current path through capacitive coupling) is ensured to stabilize power transfer. In addition, because a voltage applied to the low-voltage side conductor decreases with a voltage division ratio of the capacitively divided voltages, it is possible to ensure safety even when power transfer increases.

In the structures shown in FIG. 2 to FIG. 3B, numerical specific examples are as follows. The alternating voltage generating circuit 13 generates a high voltage within the range of about several hundreds of volts to about several kilovolts. It is desirable to set the high voltage at about 3 kV or below in order to prevent local corona discharge onset. The frequency is determined within the range of about 100 kHz to about 10 MHz. When the frequency is equal to or higher than a certain frequency, electromagnetic waves are radiated from the high-voltage side conductors 11 and 21. Thus, the upper limit of the frequency is restricted because of a radiation loss of electromagnetic waves.

When transferred power is lower than or equal to about 50 W, the size of the high-voltage side conductor 11 of the power transmission device 101 is about $\Phi$10 mm to about 30 mm as a measure. The size of each of the high-voltage side conductors 11 and 21 is determined on the basis of restrictions, such as a necessary transferred power, a power transfer efficiency, and the physical shape of a product. For example, when a power larger than or equal to about 50 W is handled, the size of an electrode may be equal to or larger than about $\Phi$30 mm, whereas, when a minute power is handled, the size of an electrode may be smaller than or equal to about 10 mm. The above described various conditions are used in a specific case, and are not limited to these values or ranges.

Figure 4:
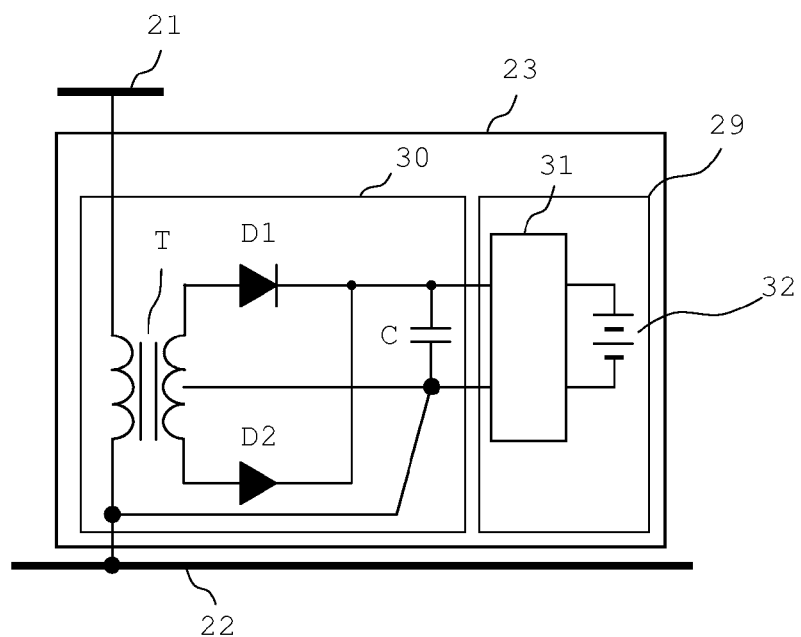
FIG. 4 is a view that shows the circuit configuration of a load circuit 23 provided inside the power reception device 201 shown in FIG. 2.

FIG. 4 is a view that shows the circuit configuration of a load circuit 23 provided inside the power reception device 201 shown in FIG. 2. The load circuit 23 includes a rectifying smoothing circuit 30 and a low-voltage circuit portion 29. The rectifying smoothing circuit 30 includes a step-down transformer T, rectifier diodes D1 and D2 and a smoothing capacitor C. One end of a primary coil of the transformer T is connected to the high-voltage side conductor 21, and the other end is connected to the low-voltage side conductor 22. A full-wave rectifying circuit including the rectifier diodes D1 and D2 and the smoothing capacitor C is formed in a secondary coil of the transformer T.

A resonant circuit may be formed in the rectifying smoothing circuit 30. Alternatively, a resonant circuit may be provided upstream of or downstream of the rectifying smoothing circuit 30. The following advantageous effect may be obtained by providing a resonant circuit. The power transmission device 101 and the power reception device 204 are coupled to each other at a degree of coupling k (k<1). When no resonant circuit is incorporated, uncoupled energy will be a loss. That is, the power transfer efficiency is low. When a resonant circuit is provided, it is possible to store uncoupled energy in the resonant circuit as reactive energy. This may be understood that an energy loss in the case of no resonant circuit is recycled. In addition, it may also be understood that the Q factor of the resonant circuit increases an equivalent coupling coefficient. As a result, the power transfer efficiency may be improved. Particularly, when the degree of coupling is weak (k<<1), the advantageous effect appears remarkably.

In this example, the power transfer system 401 constitutes a noncontact charging device, and the low-voltage circuit portion 29 includes a control circuit 31 and a secondary battery 32, which operate on a voltage rectified and smoothed by the rectifying smoothing circuit 30 as a power supply. The control circuit 31 controls charging of the secondary battery 32, controls charging using the secondary battery 32 as a power supply, and carries out a predetermined circuit operation other than those.

Note that it is also applicable that a device for monitoring the state of charge of the secondary battery 32 through communication is provided, and a circuit for controlling charging of the secondary battery 32 is provided at the power transmission device 101 side. The above described configuration may be similarly applied to a charging element, such as an electric double layer, other than the secondary battery.

Second Embodiment

Figure 5:
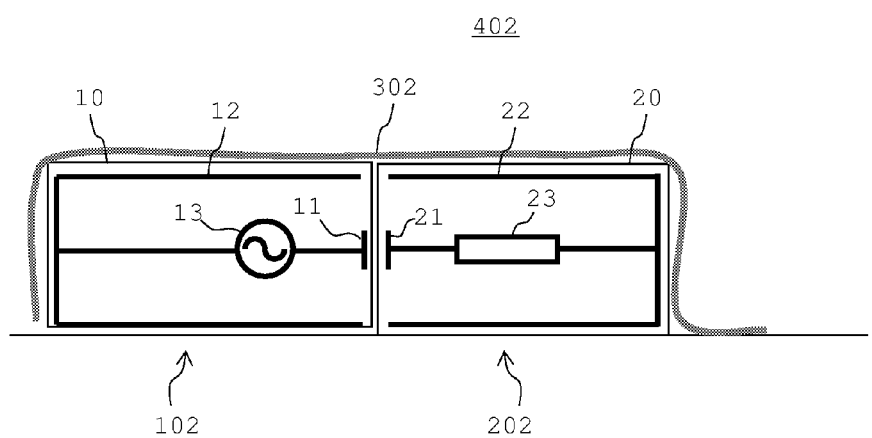
FIG. 5 is a cross-sectional view that conceptually shows a relevant portion of a power transfer system 402 according to a second embodiment.

FIG. 5 is a cross-sectional view that conceptually shows a relevant portion of a power transfer system 402 according to a second embodiment. The power transfer system 402 includes a power transmission device 102 and a power reception device 202.

In the example shown in FIG. 2, the power reception device 201 is placed on the power transmission device 101. FIG. 5 shows an example in which the power transmission device 102 and the power reception device 202 are arranged side by side. As shown in FIG. 5, a high-voltage side conductor 11 is provided at the side of the power transmission device 102, a high-voltage side conductor 21 is provided at the side of the power reception device 202, and a capacitive coupling conductor 302 covers the power transmission device 102 and the power reception device 202 that are arranged side by side. In this manner, it is possible to achieve capacitive coupling.

Third Embodiment

Figure 6:
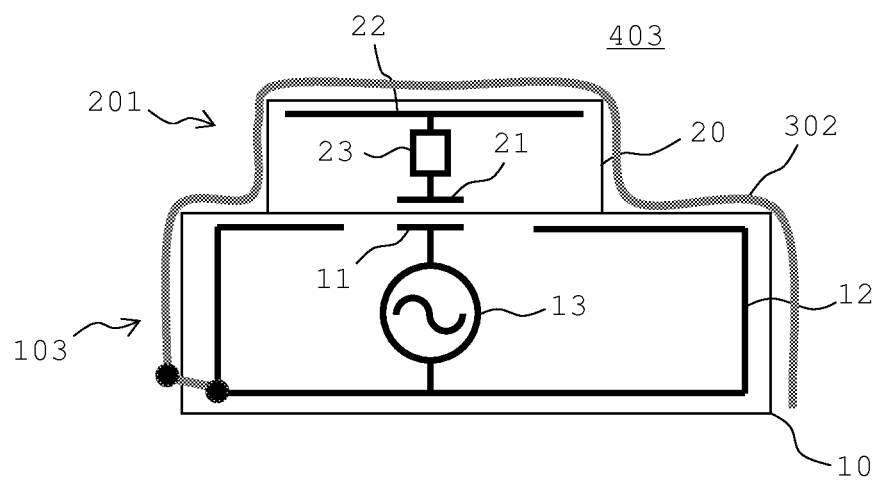
FIG. 6 is a cross-sectional view that conceptually shows a relevant portion of a power transfer system 403 according to a third embodiment.

FIG. 6 is a cross-sectional view that conceptually shows a relevant portion of a power transfer system 403 according to a third embodiment. The configuration of the power transfer system 403 differs from that shown in FIG. 2 in that the capacitive coupling conductor 302 is electrically continuous with the low-voltage side conductor 12 of the power transmission device 103. With the above configuration, a capacitance generated between the capacitive coupling conductor 302 and the low-voltage side conductor 22 is directly connected between the low-voltage side conductors 12 and 22. Thus, it is possible to increase (gain) a capacitance between the low-voltage side conductors 12 and 22.

Fourth Embodiment

Figure 7A:
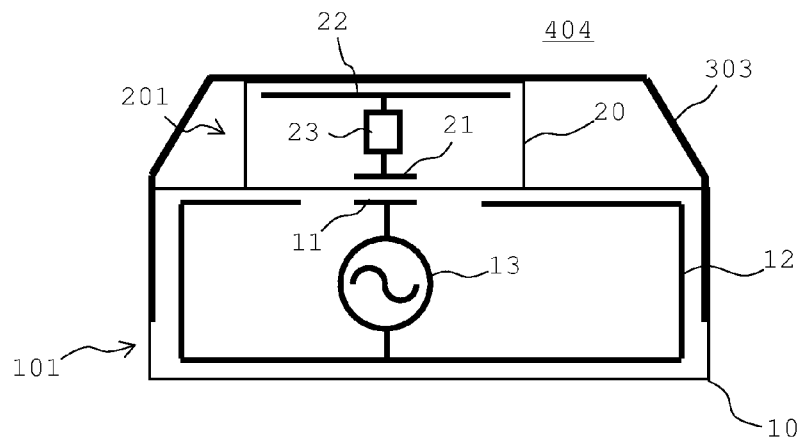
FIG. 7A is a cross-sectional view that conceptually shows relevant portions of a power transfer system 404 according to a fourth embodiment.
Figure 7B:
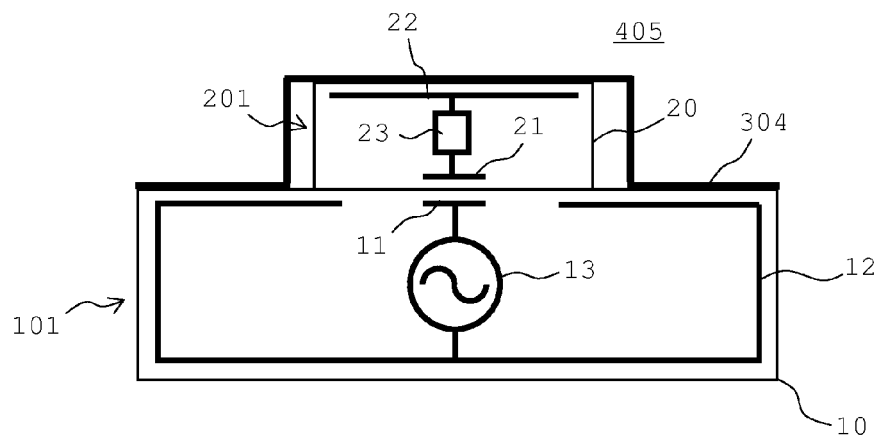
FIG. 7B is a cross-sectional view that conceptually shows relevant portions of a power transfer system 405 according to a fourth embodiment.

FIG. 7A and FIG. 7B are cross-sectional views that conceptually show relevant portions of two power transfer systems 404 and 405 according to a fourth embodiment. In the example shown in FIG. 7A, a capacitive coupling conductor 303 formed of a metal plate is provided. The capacitive coupling conductor 303 is formed in advance so that the inner top surface faces the low-voltage side conductor 22 of the power reception device 201, and the skirt portion faces the low-voltage side conductor 12 of the power transmission device 101.

In the example shown in FIG. 7B, a capacitive coupling conductor 304 formed of a metal plate is provided. The capacitive coupling conductor 304 is formed in advance so that the inner top surface faces the low-voltage side conductor 22 of the power reception device 201, and a flanged portion faces the low-voltage side conductor 12 on the upper surface of the power transmission device 101.

The capacitive coupling conductors 303 and 304 may presumably have various shapes, such as a substantially U-shape in cross section, in which only three sides are bent and formed, and a pentahedron shape in which the entire power transmission device 101 and power reception device 201 is surrounded. In addition, the capacitive coupling conductors 303 and 304, and the like, may have a small hole or may be formed by machining a mesh metal plate. Furthermore, the conductor may be formed by plating the surface of plastics.

Note that as described in the third embodiment, the capacitive coupling conductors 303 and 304 are made electrically continuous with the low-voltage side conductor of the power transmission device side, thus making it possible to further increase the strength of coupling. However, because it is basically desirable that no conductor is exposed, the surfaces of both the power transmission device and the power reception device are electrically insulated in that case. In addition, it is the same matter in this fourth embodiment that the capacitive coupling conductor has almost no sharp portion and is covered with an insulating material in order to prevent a local increase in strength of an electric field.

Note that the capacitive coupling conductors 303 and 304, and the like, may be attached to the power transmission device 101 side to serve as part of the power transmission device.

Fifth Embodiment

Figure 8A:
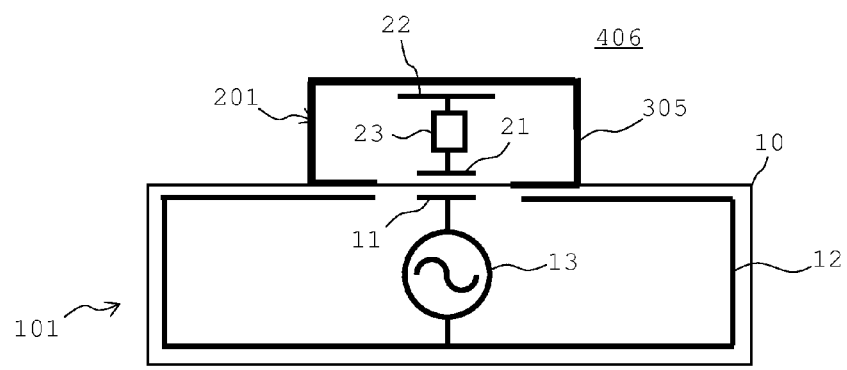
FIG. 8A is a cross-sectional view that conceptually shows relevant portions of a power transfer system 406 according to a fifth embodiment.
Figure 8B:
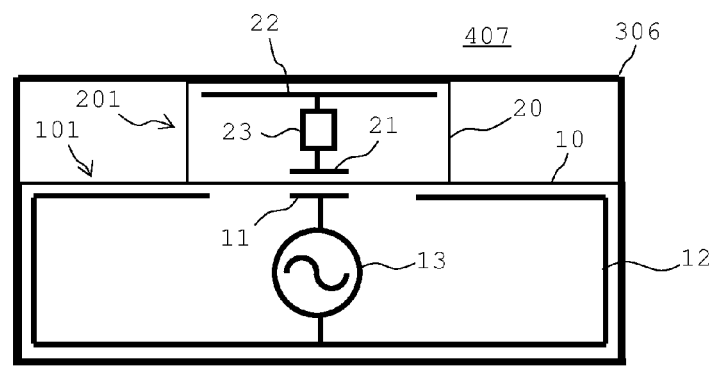
FIG. 8B is a cross-sectional view that conceptually shows relevant portions of a power transfer system 407 according to a fifth embodiment.

FIG. 8A and FIG. 8B are cross-sectional views that conceptually show relevant portions of two power transfer systems 406 and 407 according to a fifth embodiment. In the example shown in FIG. 8A, a capacitive coupling conductor 305 formed of a metal plate is provided so as to surround the power reception device 201. The capacitive coupling conductor 305 is formed in advance so that the inner top surface faces the low-voltage side conductor 22 of the power reception device 201, and the lower surface portion faces the low-voltage side conductor 12 on the upper surface of the power transmission device 101.

The capacitive coupling conductor 305 may be bent at some corners to form a substantially U-shape in cross section, a substantially C-shape in cross section or a substantially rectangular shape in cross-section. In addition, the capacitive coupling conductor 305 may have a substantially hexahedron shape. When the capacitive coupling conductor 305 has a substantially U-shape in cross section, a substantially C-shape in cross section or a substantially rectangular shape in cross-section, it is only necessary that, at the time of using it, the power reception device 201 is inserted from the opening of the capacitive coupling conductor 305 inside, thus combining the power reception device 201 with the capacitive coupling conductor 305. In addition, when the capacitive coupling conductor 305 has a substantially hexahedron shape, it is only necessary that one side of the capacitive coupling conductor 305 is made openable, and the power reception device 201 is set inside, thus combining the power reception device 201 with the capacitive coupling conductor 305.

In the example of FIG. 8B as well, a capacitive coupling conductor 306 formed of a metal plate is provided. The capacitive coupling conductor 306 is formed in advance so that the inner top surface faces the low-voltage side conductor 22 of the power reception device 201, and the inner bottom surface faces the low-voltage side conductor 12 on the lower surface of the power transmission device 101.

The capacitive coupling conductor 306 may be bent at some corners to form a substantially U-shape in cross section, a substantially C-shape in cross section or a substantially rectangular shape in cross-section. In addition, the capacitive coupling conductor 306 may have a substantially hexahedron shape. When the capacitive coupling conductor 306 has a substantially U-shape in cross section, it is only necessary that, at the time of using it, the power transmission device 101 and the power reception device 201 both are inserted from the opening of the capacitive coupling conductor 306 inside, thus combining both the power transmission device 101 and the power reception device 201 with the capacitive coupling conductor 306. In addition, when the capacitive coupling conductor 306 has a substantially hexahedron shape, it is only necessary that one side of the capacitive coupling conductor 306 is made openable, and the power transmission device 101 and the power reception device 201 both are inserted inside, thus combining both the power transmission device 101 and the power reception device 201 with the capacitive coupling conductor 306.

Note that the capacitive coupling conductors 305 and 306, and the like, may have a small hole or may be formed by machining a mesh metal plate. Furthermore, the capacitive coupling conductor may be formed by plating the surface of plastics.

REFERENCE SIGNS LIST

A1 opening
C smoothing capacitor
D1, D2 rectifier diode
T transformer
10, 20 casing
11, 21 high-voltage side conductor
12, 22 low-voltage side conductor
13 alternating voltage generating circuit
23 load circuit
29 low-voltage circuit portion
30 rectifying smoothing circuit
31 control circuit
32 secondary battery
101 to 103 power transmission device
201, 202 power reception device
301 to 306 capacitive coupling conductor
401 to 407 power transfer system

The invention claimed is:

1. A power transfer system comprising:
a power transmission device having a power transmission capacitive coupling electrode that includes a power transmission high-voltage side conductor and a power transmission low-voltage side conductor;
a power reception device having a power reception capacitive coupling electrode that includes a power reception high-voltage side conductor and a power reception low-voltage side conductor;
a capacitive coupling conductor capacitively coupled to the power transmission low-voltage side conductor and the power reception low-voltage side conductor;
an alternating voltage generating circuit that generates an alternating voltage that is applied between the power transmission high-voltage side conductor and the power transmission low-voltage side conductor; and
a load circuit of electric power induced between the power reception high-voltage side conductor and the power reception low-voltage side conductor.

2. The power transfer system according to claim 1, wherein the capacitive coupling conductor is a woven fabric containing a conductive material.

3. The power transfer system according to claim 1, wherein the capacitive coupling conductor is a body formed of a conductor.

4. The power transfer system according to claim 1, wherein the capacitive coupling conductor is a metal plate.

5. The power transfer system according to claim 4, wherein the metal plate surrounds the power reception device.

6. The power transfer system according to claim 4, wherein the metal plate is configured to surround both the power transmission device and the power reception device.

7. A noncontact charging device comprising:
the power transfer system according to claim 1, wherein
the load circuit includes a rectifying smoothing circuit that rectifies and smoothes an alternating voltage induced between the power reception high-voltage side conductor and the power reception low-voltage side conductor and a charging element that is charged with an output from the rectifying smoothing circuit, and
the power transmission device is provided with a control circuit that controls the alternating voltage generating circuit to control charging to the charging element or the load circuit is provided with a control circuit that controls the rectifying smoothing circuit to control charging to the charging element.

8. A power transfer system comprising:
a power transmission device having a power transmission capacitive coupling electrode that includes a power transmission high-voltage side conductor and a power transmission low-voltage side conductor;
a power reception device having a power reception capacitive coupling electrode that includes a power reception high-voltage side conductor and a power reception low-voltage side conductor;
a capacitive coupling conductor that is electrically continuous with the power transmission low-voltage side conductor and capacitively coupled to the power reception low-voltage side conductor;
an alternating voltage generating circuit that generates an alternating voltage that is applied between the power transmission high-voltage side conductor and the power transmission low-voltage side conductor; and
a load circuit of electric power induced between the power reception high-voltage side conductor and the power reception low-voltage side conductor.

9. The power transfer system according to claim 8, wherein the capacitive coupling conductor is a woven fabric containing a conductive material.

10. The power transfer system according to claim 8, wherein the capacitive coupling conductor is a body formed of a conductor.

11. A noncontact charging device comprising:
the power transfer system according to claim 8, wherein
the load circuit includes a rectifying smoothing circuit that rectifies and smoothes an alternating voltage induced between the power reception high-voltage side conductor and the power reception low-voltage side conductor and a charging element that is charged with an output from the rectifying smoothing circuit, and
the power transmission device is provided with a control circuit that controls the alternating voltage generating circuit to control charging to the charging element or the load circuit is provided with a control circuit that controls the rectifying smoothing circuit to control charging to the charging element.

* * * * *